US010951022B2

(12) United States Patent
Lang

(10) Patent No.: US 10,951,022 B2
(45) Date of Patent: Mar. 16, 2021

(54) CURRENT DISTRIBUTOR AND PROTECTION SYSTEM FOR A VEHICLE

(71) Applicant: Robert Bosch GmbH, Stuttgart (DE)

(72) Inventor: Thomas Lang, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 16/308,017

(22) PCT Filed: May 23, 2017

(86) PCT No.: PCT/EP2017/062429
§ 371 (c)(1),
(2) Date: Dec. 7, 2018

(87) PCT Pub. No.: WO2017/211586
PCT Pub. Date: Dec. 14, 2017

(65) Prior Publication Data
US 2019/0312427 A1 Oct. 10, 2019

(30) Foreign Application Priority Data

Jun. 8, 2016 (DE) ..................... 10 2016 210 058.0

(51) Int. Cl.
*H02H 7/22* (2006.01)
*B60R 16/03* (2006.01)
(Continued)

(52) U.S. Cl.
CPC ............. *H02H 7/222* (2013.01); *B60R 16/03* (2013.01); *H01H 85/30* (2013.01); *H01H 85/46* (2013.01);
(Continued)

(58) Field of Classification Search
CPC ........ H02H 7/222; H02H 1/0007; H02H 7/22; B60R 16/03; H01H 85/30; H01H 85/46;
(Continued)

(56) References Cited

U.S. PATENT DOCUMENTS

2010/0019913 A1 1/2010 Rodseth et al.
2010/0109891 A1 5/2010 Lee
(Continued)

FOREIGN PATENT DOCUMENTS

CN 103222144 A 7/2013
CN 104810782 A 7/2015
(Continued)

OTHER PUBLICATIONS

International Search Report for Application No. PCT/EP2017/062429 dated Sep. 11, 2017 (English Translation, 2 pages).

*Primary Examiner* — Gary L Laxton
(74) *Attorney, Agent, or Firm* — Michael Best & Friedrich LLP

(57) ABSTRACT

A current distributor for a vehicle, having an input and a plurality of load channels which connect the input to a connected load via a safety fuse and a line in each case, and to a protection system for a vehicle having such a current distributor. In this case, a standby channel connects the input to the connected loads via an electronic fuse, wherein an evaluation and control unit checks the safety fuses for functionality and switches on a semiconductor switch of the electronic fuse and forms a redundant current path between the input and the connected loads via the standby channel if at least one of the safety fuses is identified as having been tripped.

13 Claims, 2 Drawing Sheets

(51) Int. Cl.
*H01H 85/30* (2006.01)
*H02H 1/00* (2006.01)
*H01H 85/46* (2006.01)
H01H 85/20 (2006.01)
H01H 1/00 (2006.01)

(52) U.S. Cl.
CPC ... *H02H 1/0007* (2013.01); *H01H 2001/0005* (2013.01); *H01H 2085/208* (2013.01); *H01H 2300/052* (2013.01)

(58) Field of Classification Search
CPC ..... H01H 2001/0005; H01H 2085/208; H01H 2300/052
See application file for complete search history.

(56) References Cited

U.S. PATENT DOCUMENTS

| | | | | |
|---|---|---|---|---|
| 2015/0028668 | A1* | 1/2015 | Smith | B60R 16/0238 |
| | | | | 307/9.1 |
| 2018/0208064 | A1* | 7/2018 | Wortberg | B60L 1/12 |
| 2018/0226789 | A1* | 8/2018 | Elliott | H02H 1/0092 |
| 2019/0140438 | A1* | 5/2019 | Schiemann | H02H 1/0007 |

FOREIGN PATENT DOCUMENTS

| | | |
|---|---|---|
| DE | 20001323 | 3/2000 |
| JP | S63212146 A | 9/1988 |
| JP | 2003100197 A | 4/2003 |
| JP | 2010146773 A | 7/2010 |
| JP | 2011069720 A | 4/2011 |
| JP | 2012023905 A | 2/2012 |
| KR | 20150031729 A | 3/2015 |
| WO | 2010004260 | 1/2010 |

* cited by examiner

CURRENT DISTRIBUTOR AND PROTECTION SYSTEM FOR A VEHICLE

The invention is based on a current distributor for a vehicle and on a protection system for a vehicle.

From the prior art, current distributors for vehicles are known, which have a plurality of load channels, each of which is secured with a safety fuse, and protection systems for vehicles having such a current distributor are known, which instead of safety fuses and relays use integrated semiconductor circuits for implementing electronic protection functions.

Such electronic fuses typically comprise an electronic power switch for connecting and disconnecting an electrical load, as well as elements for implementing protection functions in the event of current overload, overheating, etc. As a rule, in such current distributors all safety fuses are replaced by electronic fuses because the electronic fuses have advantageous properties compared to the safety fuses, such as programmable fusing characteristic curves in the current-time diagram, precise and very fast tripping, selective switching of loads, diagnostic functions such as self-diagnosis, current-voltage measurement of the channels, advanced short-circuit detection (e.g. diagnosis of arcing), and so on. In competition with the technical facilities offered by the electronic fuses are the costs of the electronic fuses, which in comparison to a simple safety fuse represent a substantial cost increase of a factor of 20 to 100 per fuse in the vehicle.

SUMMARY OF THE INVENTION

The current distributor for a vehicle and the protection system for a vehicle have the advantage that each load channel remains permanently wired to an inexpensive conventional fuse as before, wherein in a test mode or in case of a fault a standby channel, protected by an electronic fuse, can be switched in parallel with the load channels protected by safety fuses in order to establish a redundant current path.

Embodiments of the present invention provide a solution in which it is possible to implement an extended protection with a smaller number of electronic fuses than expected. In addition, a range of additional monitoring functions is obtained, to make the on-board power supply operationally safer and/or to increase the availability of the on-board power supply in the event of a fault. Up to now, the conventional or electronic fuses in a conventional current distributor have been permanently assigned to a specific load channel and therefore permanently electrically connected to this load channel. If a current distributor has, for example, n load channels, then at least n fuse elements are used in order to protect the n load channels. The n fuse elements can be composed of either n conventional fuses or of n electronic fuses or a combination of these protection elements with a total sum of n protection elements. In embodiments of the present invention the number of electronic fuses that can be used flexibly is considerably smaller than the number of safety fuses. For example, for four load channels four inexpensive safety fuses and one additional electronic fuse can be used. Embodiments of the present invention with the additional electronic fuse and an associated evaluation and control unit provide extended protection functions at lower additional cost, since only one electronic fuse is used instead of four electronic fuses. However, from a technical point of view, an extended functionality of the protection is achieved in the rare event of a fault. This can preferably be used for monitoring the redundant current path if a fault is present or has previously occurred, which has led to a fuse being tripped.

Embodiments of the present invention provide a current distributor for a vehicle, which has an input and a plurality of load channels which connect the input to a connected load via a safety fuse and a line. In these embodiments a standby channel connects the input to the connected loads via an electronic fuse, wherein an evaluation and control unit monitors the safety fuses for functionality and switches a semiconductor switch of the electronic fuse to the conducting state and forms a redundant current path between the input and the connected loads via the standby channel if at least one of the safety fuses is identified as having been tripped.

In addition, a protection system for a vehicle is proposed, having a voltage source which provides an on-board power supply voltage via a main line, as well as such a current distributor which applies the on-board power supply voltage to a plurality of connected loads.

The invention is based on the consideration that the probability of a fault occurring in a vehicle on-board power supply (e.g. overcurrent, short circuit), in which a separation of load channels is essential, is very low. Therefore, not every load channel needs to be permanently protected by an expensive electronic fuse. In addition, it is possible to exploit the fact that the voltage in a vehicle on-board power supply is not constant, but fluctuates within a range because of the electrical loading. This effect can be exploited to perform a recurring selective monitoring of the proper functioning of the safety fuses and the electronic fuse. Thus, for example, such a test mode can be triggered whenever the on-board supply voltage exceeds a predefined threshold.

In the event of a defective fuse, the semiconductor switch of the electronic fuse is permanently switched to the conducting state, so that the faulty fuse can be bypassed and the resulting alternative current path can be "precisely" monitored using advanced diagnostic functions until the defective fuse is replaced. The evaluation and control unit additionally ensures that in a test mode the semiconductor switch is periodically switched on and is monitored for its functionality. Embodiments of the invention retain the conventional safety fuses in a multi-channel current distributor and combine them with a single electronic fuse for all load channels, or at least for a specified number of load channels, such that not every load channel needs to be individually protected with an electronic fuse. The electronic fuse only assumes the protection function in the event of a fault, and until the fuse is changed. In addition, in the event of a failure of one of the safety fuses in the current distributor, the electronic fuse is able to pass the current to the connected electrical loads and to monitor them by means of a diagnostic. The evaluation and control unit monitors each load channel in a specific sequence and frequency and can detect in which load channel the fuse has been triggered or blown. The risk of the breakdown of the semiconductor switches is reduced, since in the test mode these are not constantly supplied with current. This allows a FIT (failure-in-time) rate to be reduced and the safety in the vehicle (redundancy) and the on-board power supply availability to be increased. Since the electronic fuse is switched off during normal operation and must only carry the full current in rare cases, a higher power loss is permissible. The on-resistance of the semiconductor switch can therefore be selected with a higher resistance, which reduces the costs of the semiconductor switch.

The evaluation and control unit in the present case can be understood to mean an electrical device such as a control unit, which processes and/or evaluates detected sensor signals. The analysis and control unit can have at least one interface, which can be implemented in hardware and/or software. In the case of a hardware-based design, the interfaces can be, for example, part of a so-called system-ASIC, which includes the wide range of functions of the analysis and control unit. It is also possible, however, that the interfaces are dedicated integrated circuits, or at least in part consist of discrete components. In the case of a software-based design, the interfaces can be software modules which exist, for example, on a micro-controller in addition to other software modules. Also advantageous is a computer program product with program code, which is stored on a machine-readable medium, such as a semiconductor memory, a hard drive or an optical memory, and is used to perform the analysis when the program is executed by the analysis and control unit.

The measures and extensions according to the invention enable advantageous improvements of the current distributor according to the invention for a vehicle and of the protection system according to the invention for a vehicle.

A particularly advantageous feature is that the evaluation and control unit can monitor the flow of current in the standby channel, for example by means of a current meter, for an overcurrent fault. The safety fuse may have interrupted the flow of current in the associated load channel for two reasons. In the first case, the fuse may be defective and may have blown without an overcurrent fault being present. In a second case, the fuse may have been tripped and blown correctly as a result of an impermissible overcurrent. Therefore, the evaluation and control unit can evaluate the at least one tripped fuse as having tripped if an overcurrent fault has occurred, or as defective if there is no overcurrent fault. In addition, the evaluation and control unit can leave the semiconductor switch in the conducting state and maintain the redundant current path through the standby channel if the tripped safety fuse is evaluated as defective. This means that no overcurrent is present, but in fact a defective safety fuse. Alternatively, the evaluation and control unit can switch the semiconductor switch into the blocking state and disconnect the redundant current path through the standby channel if the tripped safety fuse is evaluated as defective. This means that an overcurrent fault exists, and the fuse has been triggered correctly.

In an advantageous design of the current distributor, a standby channel can be provided for each of a specifiable number of load channels. This allows the maximum load current in the standby channel, which flows through the electronic fuse, to be advantageously estimated in advance and a corresponding semiconductor switch to be selected, since in the worst case all the safety fuses of the load channels are faulty and the necessary currents for supplying the connected loads must flow through the semiconductor switch of the electronic fuse.

In another advantageous design of the current distributor, the evaluation and control unit can determine a first voltage before and a second voltage after the respective safety fuse and compare them with each other in order to monitor the functionality of the safety fuses. In this case, the evaluation and control circuit can detect a tripped safety fuse if the first voltage is different from the second voltage.

In an advantageous design of the protection system, at least one protection function can switch the evaluation and control unit, cyclically and/or upon the presence of at least one specified criterion, into a test mode in which the evaluation and control unit monitors the safety fuses and the electronic safety fuse of the current distributor for proper functionality.

In another advantageous design of the protection system, after monitoring the safety fuses the evaluation and control unit can switch the semiconductor switch into the conducting state and if all the safety fuses are evaluated as properly functional, detect and evaluate a corresponding current flow in the standby channel, wherein a detected current flow in the standby channel can represent a fault-free semiconductor switch.

In another advantageous design of the protection system, the evaluation and control unit can signal a defective safety fuse and/or a defective semiconductor switch to the at least one protection function. In this case, in the event of at least one safety fuse being evaluated as defective, the protection function can switch the evaluation and control circuit into an operating mode in which the evaluation and control unit can monitor the flow of current in the standby channel and maintain the redundant current path through the standby channel or in the overcurrent case, disconnect it. This enables a higher-level protection function to decide whether the subsequent operating mode is allowed, or if the vehicle should be stopped as quickly as possible.

Exemplary embodiments of the invention are shown in the drawing and are explained in more detail in the following description. In the drawing, the same reference numbers denote the same components or elements which perform identical or similar functions.

DETAILED DESCRIPTION

Figure 1:
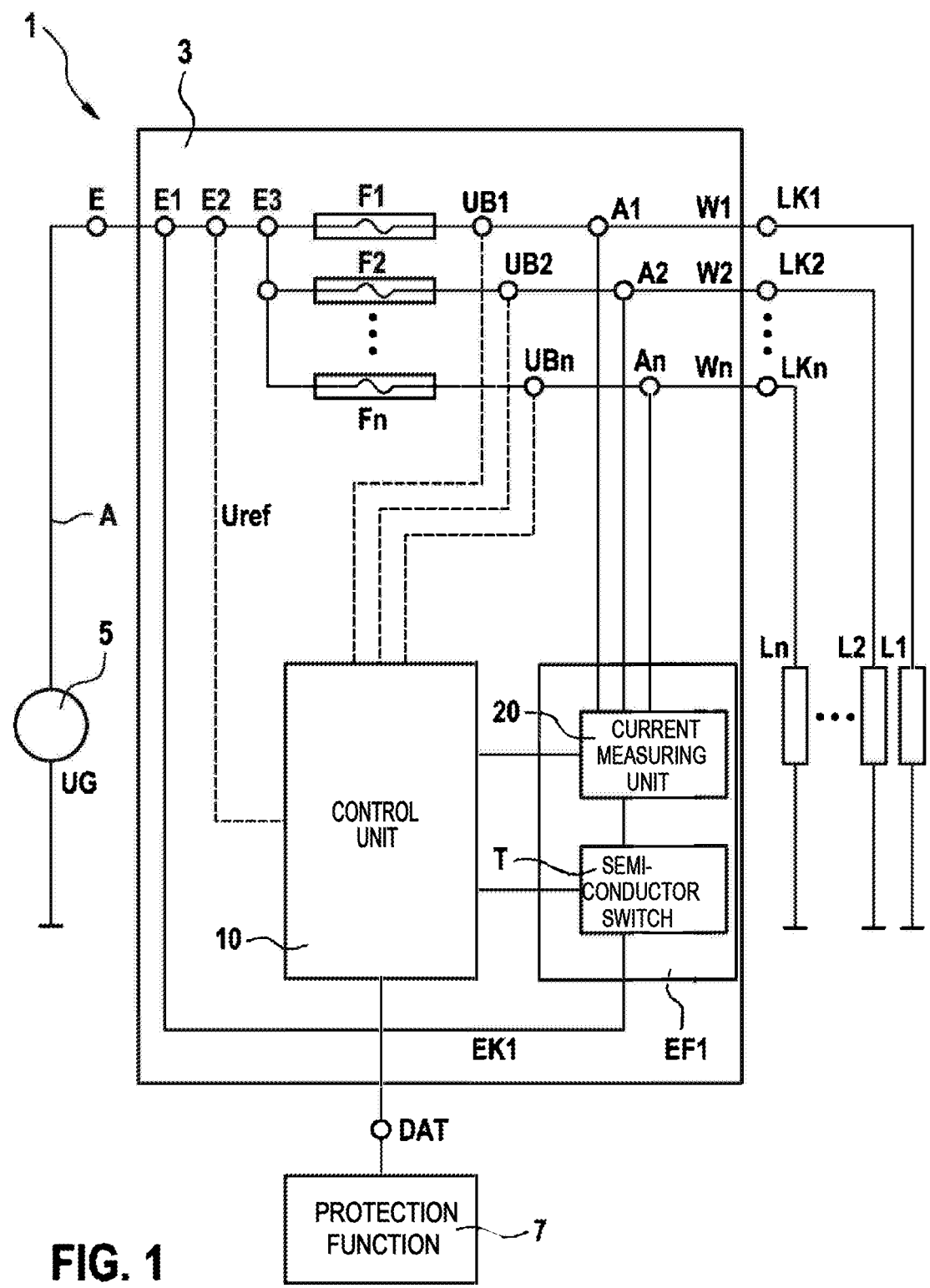
FIG. 1 shows a schematic block diagram of an exemplary embodiment of a protection system according to the invention for a vehicle having an exemplary embodiment of a current distributor according to the invention with n load channels.
Figure 2:
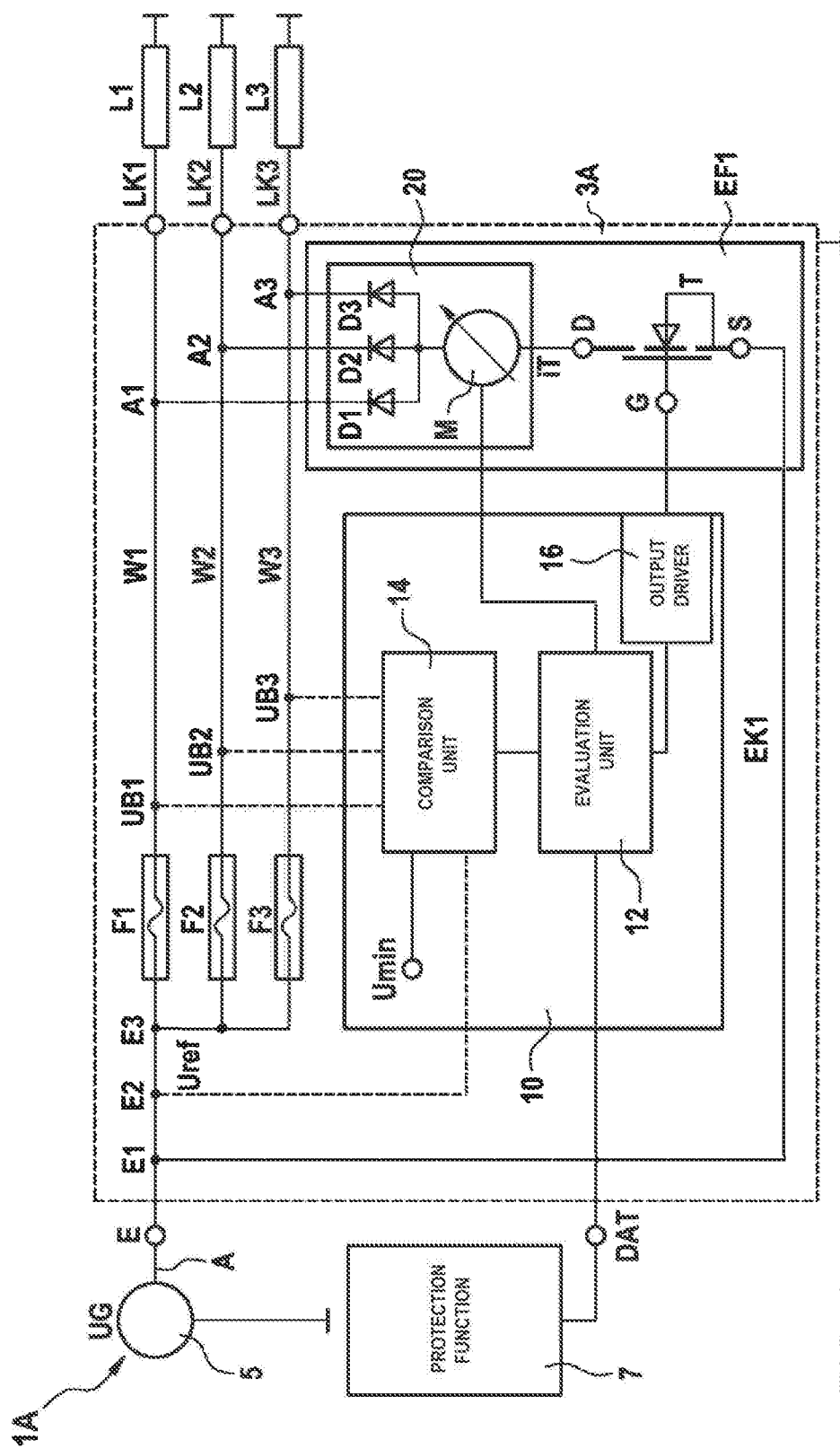
FIG. 2 shows a schematic block diagram of an exemplary embodiment of a protection system according to the invention for a vehicle having an exemplary embodiment of a current distributor according to the invention with three load channels.

As can be seen from FIGS. 1 and 2 the exemplary embodiments illustrated of protection system 1, 1A according to the invention for a vehicle each comprise a voltage source 5, which provides an on-board power supply voltage UG via a main line A, and a current distributor 3, 3A which applies the on-board power supply voltage UG to a plurality of connected loads L1, L2, L3, Ln.

As can also be seen from FIGS. 1 and 2, the illustrated examples of a current distributor 3, 3A according to the invention for a vehicle each comprise an input E and a plurality of load channels LK1, LK2, LK3, LKn, which connect the input E to a connected load L1, L2, L3, Ln via a safety fuse F1, F2, F3, Fn and a line W1, W2, W3, Wn in each case. In this case a standby channel EK1 connects the input E to the connected loads L1, L2, L3, Ln via an electronic fuse EF1. An evaluation and control unit 10 monitors the safety fuses F1, F2, F3, Fn for functionality and switches a semiconductor switch T of the electronic fuse EF1 to the conducting state and forms a redundant current path between the input E and the connected loads L1, L2, L3, Ln via the standby channel EK1 if at least one of the safety fuses F1, F2, F3, Fn is identified as having been tripped.

As is also apparent from FIGS. 1 and 2, at least one protection function 7 switches the evaluation and control unit 10 cyclically and/or upon the presence of at least one specified criterion, into a test mode in which the evaluation and control unit 10 monitors the safety fuses F1, F2, F3, Fn and the electronic safety fuse EF1 of the current distributor 3, 3A for functionality. If all of the safety fuses F1, F2, F3, Fn are evaluated as functional, in the exemplary embodiments shown the evaluation and control unit 10 switches the semiconductor switch T to a conducting state after monitoring the safety fuses F1, F2, F3, Fn and detects and evaluates a corresponding current flow iT in the standby channel EK1. In this case a current flow iT detected in the standby channel EK1 represents a fault-free semiconductor switch T. In addition, the evaluation and control unit 10 signals a defective safety fuse F1, F2, F3, Fn and/or a defective semiconductor switch T to the at least one protection function 7. In the event of at least one safety fuse F1, F2, F3, Fn being evaluated as defective, the protection function 7 switches the evaluation and control circuit 10 into an operating mode in which the evaluation and control unit 10 monitors the flow of current iT in the standby channel EK1 and either maintains the redundant current path through the standby channel EK1 or in the case of an overcurrent, disconnects it.

As is also apparent from FIGS. 1 and 2, the standby channel EK1 branches at the input node El and is routed via the electronic fuse EF1, which comprises the semiconductor switch T and a current measuring unit 20, to output nodes Al, A2, A3, An on the lines W1, W2, W3, Wn of the individual load channels LK1, LK2, LK3, LKn. As a result, the standby channel EK1 is able to bypass each of the safety fuses F1, F2, F3, Fn in the different load channels LK1, LK2, LK3, LKn, which branch at an input node E3.

As is also apparent from FIGS. 1 and 2, the evaluation and control unit 10 monitors the flow of current iT in the standby channel EK1 for an overcurrent fault. The evaluation and control unit 10 evaluates the at least one tripped safety fuse F1, F2, F3, Fn as having been tripped if an overcurrent fault has occurred. Alternatively, the evaluation and control unit 10 evaluates the at least one tripped safety fuse F1, F2, F3, Fn as being defective if an overcurrent fault has not occurred. The evaluation and control unit 10 leaves the semiconductor switch T in the conducting state and maintains the redundant current path through the standby channel EK1 if the triggered safety fuse F1, F2, F3, Fn is evaluated as defective. Alternatively, the evaluation and control unit 10 switches the semiconductor switch T into the blocking state and disconnects the redundant current path through the standby channel EK1 if the tripped safety fuse F1, F2, F3, Fn is evaluated as having been tripped.

In order to monitor the safety fuses F1, F2, F3, Fn, the evaluation and control unit 10 determines a first voltage Uref before and a second voltage UB1, UB2, UB3, UBn after the respective fuse F1, F2, F3, Fn and compares these with each other. In this process the first voltage Uref is tapped off at an input node E2. The evaluation and control circuit 10 detects a tripped safety fuse F1, F2, F3, Fn if the first voltage Uref differs from the second voltage UB1, UB2, UB3, UBn.

As can be seen from FIG. 2, in the illustrated exemplary embodiment, a standby channel EK1 is provided for a specifiable number of three load channels LK1, LK2, LK3. In addition to the activation by the at least one protection function 7, the evaluation and control unit 10 in the illustrated exemplary embodiment switches into the test mode if the first voltage Uref exceeds a specified threshold value Umin. As is also apparent from FIG. 2, the evaluation and control unit 10 comprises a comparison unit 14, which compares the second voltages UB1, UB2, UB3 and the threshold value Umin with the first voltage Uref, and an evaluation circuit 12 which evaluates the comparison processes and outputs the evaluation result via a data channel DAT to the at least one protection function 7. In addition, the evaluation and control unit 10 or the evaluation circuit 12 can receive control commands from the at least one protection function 7 via the data channel DAT. In addition, the evaluation circuit 12 can switch the semiconductor switch T into a conducting or a blocking state via an output driver 16. As is also apparent from FIG. 2, a source terminal S of the semiconductor switch T is connected to the input node El, a gate terminal G of the semiconductor switch T is connected to the output driver 16 and a drain terminal D of the semiconductor switch T is connected to the current measuring unit 20. The current measuring unit 20 comprises a current meter M, the output of which is connected to the evaluation circuit 12. In addition, the current measuring unit 20 comprises three diodes D1, D2, D3. A first diode D1 connects the standby channel EK1 to a first output node A1 of a first line W1 of a first load channel LK1, a second diode D2 connects the standby channel EK1 to a second output node A2 of a second line W2 of a second load channel LK2, and a third diode D3 connects the standby channel EK1 to a third output node A3 of a third wire W3 of a third load channel LK3.

Embodiments of the present invention cyclically activate the test mode of the evaluation and control unit 10. As a result, the safety fuses F1, F2, F3, Fn are cyclically monitored and the state of the semiconductor switch T of the electronic fuse EF1 is also monitored. If a fault is present in at least one of the safety fuses F1, F2, F3, Fn (fuse is blown), the evaluation and control unit 10 switches into the operating mode. In addition, the evaluation and control unit 10 outputs a corresponding signal indicating which one of the safety fuses F1, F2, F3, Fn has failed to the at least one protection function 7 via the data channel 7 DAT.

If a fault has been found in the semiconductor switch T, the fault is also output to the at least one protection function 7. The at least one protection function 7 decides whether a subsequent working cycle is permissible or whether the vehicle must be stopped as soon as possible. Thus, the vehicle can be switched off, for example, until the replacement of the semiconductor switch T, since in the event of a defective safety fuse F1, F2, F3, Fn no alternative current path is now available any longer through the standby channel EK1 and semiconductor switch T.

In the operating mode the electronic fuse EF1 replaces the function of the at least one tripped fuse F1, F2, F3, Fn, carries the current to the electrical loads L1, L2, L3, Ln and the evaluation and control unit 10 monitors the current flow iT in the standby channel EK1. In the event of an impermissible current level or overtemperature, the evaluation and control unit 10 switches off the current flow iT in the standby channel EK1 via the semiconductor switch T. In addition, the evaluation and control unit 10 outputs a corresponding signal via the data channel DAT to the at least one protection function 7. The at least one protection function 7 specifies whether and how much longer the vehicle can continue to be operated as a result of the fault or faults. The semiconductor switch T is advantageously designed in such a way that it can carry the current of all load channels LK1, LK2, LK3, LKn for a certain period of time.

Embodiments of the invention can be used in intelligent current distributors, since they represent cost-effective variants of a hybrid current distributor which comprises safety fuses and electronic fuses, for a redundant power supply in the on-board power supply.

What is claimed is:

1. A current distributor for a vehicle, the current distributor comprising:
   an input; and
   a plurality of load channels each configured to connect the input to one of a plurality of connected loads via one of a plurality of safety fuses and one of a plurality of line,
   wherein a standby channel connects the input to each of the plurality of connected loads via an electronic fuse, and
   wherein an evaluation and control unit monitors each of the plurality of safety fuses for functionality and switches a semiconductor switch of the electronic fuse to a conducting state and forms a redundant current path between the input and each of the plurality of connected loads via the standby channel when at least one of the plurality of safety fuses is identified as having been tripped.

2. The current distributor as claimed in claim 1, wherein the evaluation and control unit monitors a current flow in the standby channel for an overcurrent fault, wherein the evaluation and control unit evaluates the at least one tripped fuse as having been tripped when an overcurrent fault is present.

3. The current distributor as claimed in claim 2, wherein the evaluation and control unit leaves the semiconductor switch in the conducting state and maintains the redundant current path through the standby channel when the tripped fuse is evaluated as defective.

4. The current distributor as claimed in claim 1, wherein one standby channel is provided for each of the plurality of load channels.

5. The current distributor as claimed in claim 1, wherein the evaluation and control unit determines and compares a first voltage before and a second voltage after each of the plurality of safety fuses.

6. The current distributor as claimed in claim 5, wherein the evaluation and control circuit identifies a tripped safety fuse when the first voltage differs from the second voltage.

7. A protection system for a vehicle, comprising
   a voltage source configured to provide an on-board power supply voltage via a main line; and
   a current distributor configured to apply the on-board power supply voltage to a plurality of connected loads, the current distributor including
   an input, and
   a plurality of load channels each configured to connect the input to one of the plurality of connected loads via one of a plurality of safety fuses and one of a plurality of lines, wherein a standby channel connects the input to each of the plurality of connected loads via an electronic fuse, and
   wherein an evaluation and control unit monitors each of the plurality of safety fuses for functionality and switches a semiconductor switch of the electronic fuse to a conducting state and forms a redundant current path between the input and each of the plurality of connected loads via the standby channel when at least one of the plurality of safety fuses is identified as having been tripped.

8. The protection system as claimed in claim 7, wherein at least one protection function switches the evaluation and control unit cyclically in which the evaluation and control unit monitors each of the plurality of safety fuses and the electronic fuse of the current distributor for functionality.

9. The protection system as claimed in claim 8, wherein the evaluation and control unit, after monitoring each of the plurality of safety fuses, switches the semiconductor switch into a conducting state and detects and evaluates a corresponding current flow in the standby channel when all the plurality of safety fuses are evaluated as functional, wherein a detected current flow in the standby channel represents a fault-free semiconductor switch.

10. The protection system as claimed in claim 8, wherein the evaluation and control unit signals a defective safety fuse or a defective semiconductor switch to the at least one protection function, wherein when at least one of the plurality of safety fuses is evaluated as defective, the protection function switches the evaluation and control circuit into an operating mode in which the evaluation and control unit monitors the current flow in the standby channel and either maintains the redundant current path through the standby channel or disconnects the redundant current path in response to an overcurrent fault.

11. The current distributor as claimed in claim 1, wherein the evaluation and control unit monitors a current flow in the standby channel for an overcurrent fault, wherein the evaluation and control unit evaluates the at least one tripped fuse as defective when no overflow fault is present.

12. The current distributor as claimed in claim 2, wherein the evaluation and control unit switches the semiconductor switch to a blocking state and disconnects the redundant current path through the standby channel when the tripped safety fuse is evaluated as having been triggered.

13. The protection system as claimed in claim 8, wherein at least one protection function switches the evaluation and control unit, in response to a presence of at least one specified criterion into a test mode which monitors each of the plurality of safety fuses and the electronic fuse of the current distributor for functionality.

* * * * *